United States Patent
Joung et al.

(10) Patent No.: US 8,520,513 B2
(45) Date of Patent: Aug. 27, 2013

(54) METHOD FOR VARIABLY CONTROLLING BIT RATE OF VIDEO DATA THROUGH END-TO-END CHANNEL STATUS SENSING IN A WIBRO NETWORK

(75) Inventors: Do-Young Joung, Seoul (KR); Tae-Sung Park, Seoul (KR); Chang-Hyun Lee, Seoul (KR); Yong-Gyoo Kim, Seoul (KR); Jae-Hoon Kwon, Seoul (KR); Jae-Sung Park, Seoul (KR); Sung-Kee Kim, Seoul (KR); Ji-Wan Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 511 days.

(21) Appl. No.: 12/790,915

(22) Filed: May 31, 2010

(65) Prior Publication Data
US 2010/0232292 A1    Sep. 16, 2010

Related U.S. Application Data

(63) Continuation of application No. PCT/KR2008/007052, filed on Nov. 28, 2008.

(30) Foreign Application Priority Data

Nov. 30, 2007  (KR) .................. 10-2007-0123443

(51) Int. Cl.
*H04L 12/26* (2006.01)
(52) U.S. Cl.
USPC ............ 370/230; 370/252; 370/329; 370/468
(58) Field of Classification Search
USPC .................... 370/342, 230; 375/240, 225
See application file for complete search history.

(56) References Cited

U.S. PATENT DOCUMENTS

| | | | | |
|---|---|---|---|---|
| 6,728,233 B1 * | 4/2004 | Park et al. | | 370/342 |
| 2006/0215596 A1 * | 9/2006 | Krishnaswamy et al. | | 370/328 |
| 2007/0116117 A1 * | 5/2007 | Tong et al. | | 375/240.08 |
| 2007/0263720 A1 * | 11/2007 | He | | 375/240.03 |
| 2008/0192815 A1 * | 8/2008 | Yun et al. | | 375/225 |
| 2009/0219992 A1 * | 9/2009 | Wang | | 375/240.03 |

FOREIGN PATENT DOCUMENTS

| | | |
|---|---|---|
| KR | 2002-82698 | 10/2002 |
| KR | 2003-88510 | 11/2003 |
| KR | 2007-11242 | 1/2007 |

OTHER PUBLICATIONS

Black, Peter J., et al.; Patent Application Publication No. US 2004-218570 A1; Publication Date: Nov. 4, 2004; "Method and Apparatus for Transmitting and Receiving Variable . . . ;".

* cited by examiner

*Primary Examiner* — Chi Pham
*Assistant Examiner* — Fahmida Chowdury
(74) *Attorney, Agent, or Firm* — Cha & Reiter, LLC.

(57) ABSTRACT

A method for variably controlling a bit rate of video data through end-to-end channel status sensing in a Wireless Broadband (WiBro) network is provided. The method includes classifying wireless channel statuses of a transmission side and a reception side into normal and abnormal statuses during video data transmission; variably controlling and determining an encoding bit rate of a transmission side's encoder according to the classification result; and comparing the determined encoding bit rate with a Down Link Modulation & Coding Selection Level (DL MCS Level) which is a parameter of the reception side, so as to vary a final encoding bit rate of the transmission side.

17 Claims, 7 Drawing Sheets

METHOD FOR VARIABLY CONTROLLING BIT RATE OF VIDEO DATA THROUGH END-TO-END CHANNEL STATUS SENSING IN A WIBRO NETWORK

CROSS REFERENCE TO RELATED APPLICATION

The present application is a Continuation of PCT/KR2008/007052 filed on Nov. 28, 2008 which in turn clams a priority to an earlier Korean Patent application 10-2007-0123443 filed on Nov. 30, 2007.

BACKGROUND OF THE INVENTION

1. Field of the Invention

The present invention relates generally to a method for varying a video transfer rate in a Wireless Broadband (WiBro) network, and in particular, to a method for sensing end-to-end channel status, and a method for varying an encoding bit rate of a transmission side's encoder by integrating channel statuses of transmission/reception sides under a category of the sensed statuses, thereby improving the quality of video data during transmission of the video data.

2. Description of the Related Art

A video streaming service in the wireless network was hard to be commercialized for its high bandwidth and strict restriction on the transmission delay time. Recently, however, due to an increase in wireless access rate and the development of video compression technology, the video streaming service in the wireless network is increasingly available.

WiBro (defined in IEEE 802.16e), which is Korean-style Mobile Worldwide interoperability for Microwave Access (Mobile WiMAX), has attracted attention of mobile carriers as the next generation mobile communication network, providing a bandwidth of several tens of Mbps and a mobility of several tens of Km/H, and started its commercialization on 2007, starting with Best-Effort (BE) service.

Generally, the term 'WiBro' refers to a super high-speed Internet service in which the user can access the Internet at a high transfer rate of about 1 Mbps using a portable terminal anytime anyplace while at a standstill and on the move, and can enjoy various information and contents. WiBro, which uses a 2.3-GHz frequency band, guarantees a seamless wireless Internet service within a 1-Km cell radius even while the user moves at a speed of 60 Km/H or higher, and it is a new service by which the user can enjoy the wireless Internet at a lower fee. The currently available WiBro technology can support a mobility of 70 Km/H and a transfer rate of up to 1 Mbps per subscriber, and when commercialized, it is expected to support a mobility of 100 Km/H and a transfer rate of up to 3 Mbps. Therefore, with use of the WiBro Internet, the user can enjoy movies on the street or in the running vehicle, and can enjoy on-line games and web surfing as if he/she enjoys the Internet in the room using the wire network.

The WiBro system, a technology evolved one step further from the 2.3-GHz Wireless Local Loop (WLL) technology, covers a $4^{th}$ generation mobile communication area, and has a field broader than International Mobile Telecommunication (IMT)-2000 which is $3^{rd}$ generation mobile communication. Accordingly, WiBro is called a $3.5^{th}$ generation mobile communication technology.

WiBro has both a characteristic of the existing mobile terminal and a characteristic of a Broadband convergence Network (BcN) that converges communication, broadcasting and Internet. Therefore, it has a type in which on/off-line wire/wireless communication is combined with a broadcast service, and the multimedia service requiring a real-time property, such as Voice over IP (VoIP), Video Telephony (VT), Personal Broadcasting, etc. especially over the WiBro network, is the factor directly linked to the success of WiBro.

During operation of a video transfer application over the WiBro network, such as VT and Personal Broadcasting, WiBro controls a level of Modulation & Coding Selection (MCS) and power of a terminal depending on characteristic parameters of a WiBro wireless channel, such as Carrier to Interference and Noise Ratio (CINR), transmission (Tx) power, etc, and increases efficiency of the entire data throughput by an algorithm of a scheduler based thereon.

However, the available bandwidth continuously varies due to occurrence of traffic congestion and a characteristic of wireless channels that suddenly change because of a property of the WiBro system using the wireless network, and also due to a change in the number of users in the cell. In other words, in WiBro, unlike in the wire network, physical medium characteristics such as data transfer rate can abruptly change according to characteristic and environment of the wireless medium. The change in the characteristics can hardly be estimated. This does not raise any significant problem when the user simply enjoys a service such as Internet search, but may cause significant service degradation in terms of delay and jitter for the multimedia service such as moving picture, causing interrupted reproduction of moving images and degradation of the image quality. In addition, a service requiring guarantee of its bandwidth may suffer significant service degradation in terms of Quality of Service (QoS). Since the users' demand for multimedia also increases along with the development of the network, it is recognized that the QoS guarantee issue should necessarily be considered during development of the communication system.

In order to solve this problem, the existing WiBro terminal, when it attempts to transmit video data to the other party, estimates a bandwidth to be allocated thereto by sensing an end-to-end channel status, and varies its video transfer rate according thereto. That is, for a good channel status, the WiBro terminal increases the video transfer rate by increasing an encoding bit rate of a video encoder, and for a poor wireless channel status, the WiBro terminal decreases the encoding bit rate of the video encoder, solving the problem. The channel status estimation method is generally performed depending on a calculated delay exchanged between terminals through RTP/RTCP (Real Time Transport Protocol).

However, even though the same-size data is transmitted and received in the same WiBro network situation, a significant deviation of the delay may occur due to application of Adaptive Modulation and Coding (AMC) and Repetition. Therefore, there is a demand for an absolute reference by which the delay having a relative value can be compensated for.

SUMMARY OF THE INVENTION

An aspect of the present invention is to address at least the problems and/or disadvantages and to provide at least the advantages described below. Accordingly, an aspect of the present invention is to provide a method for properly controlling a bit rate of a video CODEC according to status of fast-varying WiBro wireless channels of a transmission side and a reception side during video data transmission in a WiBro system.

According to one aspect of the present invention, there is provided a method for variably controlling a bit rate of video data through end-to-end channel status sensing in a Wireless Broadband (WiBro) network. The method includes classifying wireless channel statuses of a transmission side and a reception side into normal and abnormal statuses during video data transmission; variably controlling and determining an encoding bit rate of a transmission side's encoder according to the classification result; and comparing the determined encoding bit rate with a Down Link Modulation & Coding Selection Level (DL MCS Level) which is a parameter of the reception side, so as to vary a final encoding bit rate of the transmission side.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. The matters defined in the description such as a detailed construction and elements are provided to assist in a comprehensive understanding of exemplary embodiments of the invention. Accordingly, those of ordinary skill in the art will recognize that various changes and modifications of the embodiment described herein can be made without departing from the scope and spirit of the invention.

Figure 1:
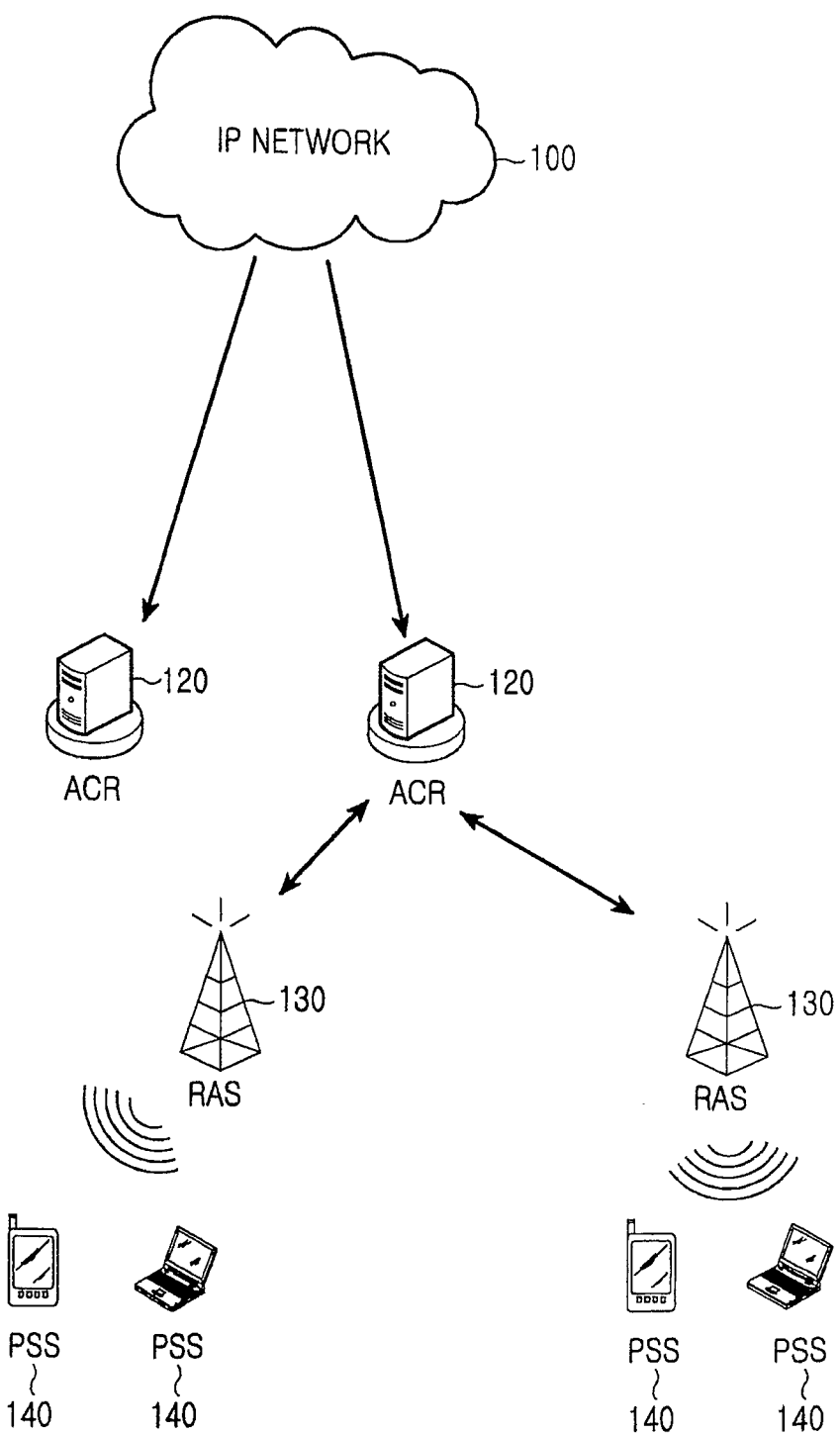
FIG. 1 is a diagram illustrating the entire configuration of a general WiBro system to which the present invention is applied.

FIG. 1 is a diagram illustrating the entire configuration of a general WiBro system to which the present invention is applied. With reference to FIG. 1, a description will now be made of a configuration of the general WiBro system.

As illustrated in FIG. 1, the WiBro system includes Access Control Routers (ACRS) 120, each of which includes a plurality of Radio Access Stations (RASs, or Base Stations) 130 and accesses the IP network 100 to control the RASs 130. In addition, the WiBro system includes a plurality of Portable Subscriber Stations (PSSs, or terminals) 140 that exchange data with the RASs 130.

The RASs 130 each exchange data with the PSSs 140 through air interfaces at an end of the wire network. In addition, the RASs 130 each have an allocated service area, i.e., cell, and provide a service to the PSSs 140 existing in the cell. The PSSs 140 can include portable communication equipments such as Personal Digital Assistant (PDA), mobile phone, notebook computer, etc. In addition, the WiBro system can include a Home Agent (HA, not shown) for supporting Internet Protocol (IP) mobility of the terminals (or PSSs) in the home network, and an Authentication, Authorization, Accounting (AAA, not shown) for performing authentication, authorization and accounting on the users and terminals to provide network access and service only to the authorized users.

Allocating a bandwidth to a WiBro terminal so that it can transmit video data is determined by a Media Access Control (MAC) scheduler algorithm of a base station (ACR or RAS). The MAC scheduler algorithm is determined depending on a service class provided by WiBro, i.e., a combination of a Carrier to interference and Noise Ratio (CINR) and transmission (Tx) power, periodically reported to the base station by the terminal, and the number of users in the cell that the base station presently perceives. Allocated the bandwidth, the terminal transmits data, the amount of which corresponds to the allocated bandwidth, and the bandwidth allocated to the terminal continuously varies due to the characteristic of wireless channels.

A bit rate control method of a video coder/decoder (CODEC) according to an embodiment of the present invention is a Cross Layer Optimization algorithm for acknowledging wireless channel characteristics of the WiBro network, estimating the wireless channel status, and controlling a bit rate of the video CODEC according to the wireless channel status of the transmission side and the reception side.

Figure 2:
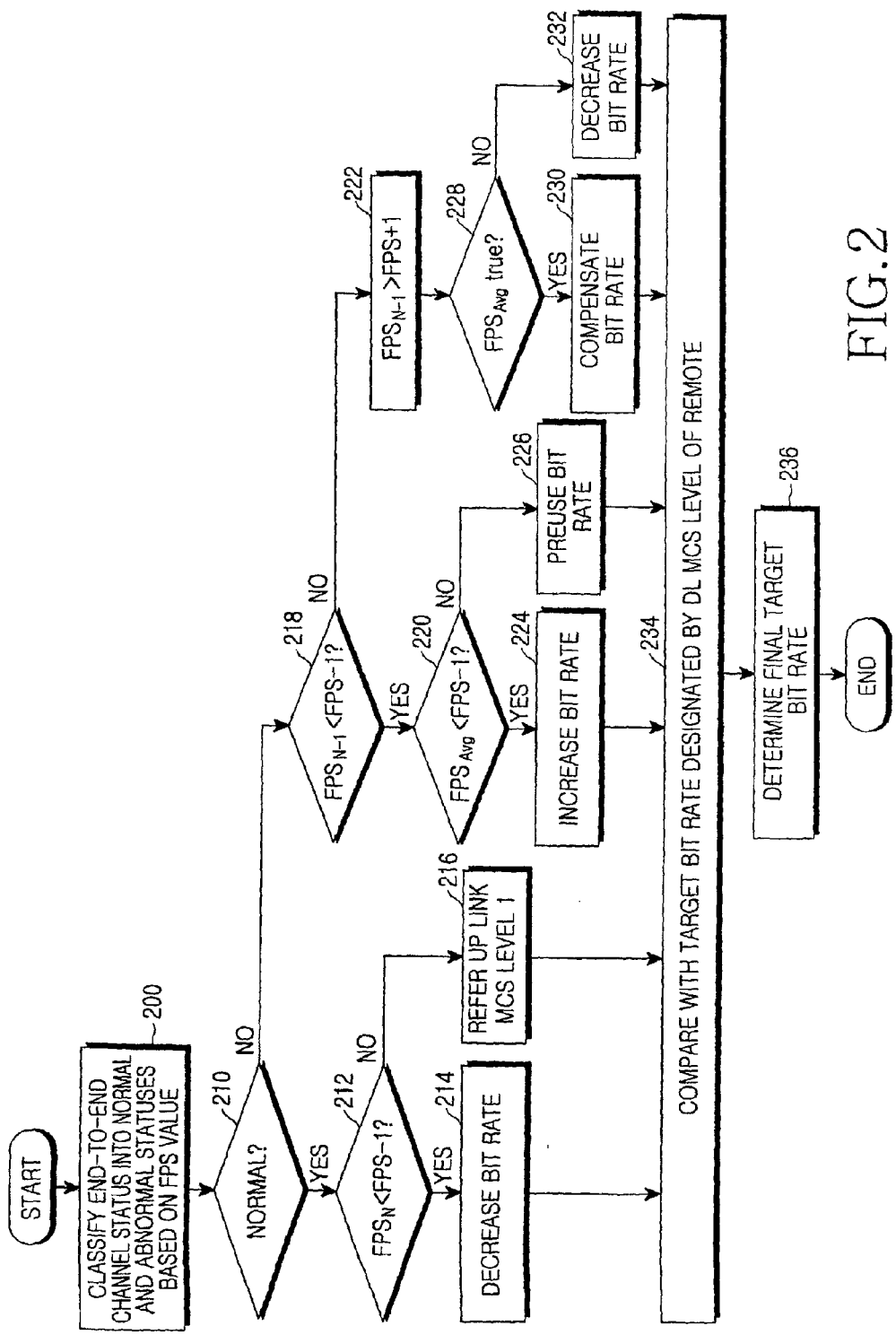
FIG. 2 is a flowchart illustrating a bit rate control method of a video CODEC during video data transmission according to an embodiment of the present invention.

FIG. 2 is a flowchart illustrating a bit rate control method of a video CODEC during video data transmission according to an embodiment of the present invention.

Referring to FIG. 2, in step 200, the bit rate control method classifies end-to-end wireless channel status of the WiBro system into normal and abnormal statuses based on a Frame Per Second (FPS) value. The FPS value is the number of video frames per second that a transmission side's terminal has sent to a reception side's terminal, and the transmission side can perceive it through a feedback from the reception side. The abnormal wireless channel status means traffic congestion-happening status, increase in the number of users, interference or other unstable channel status, etc.

A process of classifying the wireless channel status into normal and abnormal statuses based on the FPS value can be mathematically expressed as Equation (1).

$$\begin{cases} \text{Abnormal: } FPS - 1 > FPS_{N-1} \text{ or } FPS + 1 < FPS_{N-1} \\ \text{Normal: Otherwise} \end{cases} \quad (1)$$

When an FPS value $FPS_{N-1}$ that the reception terminal has received one second before the current time maintains the $FPS_{N-1}$ value within a predetermined scope (Step 210), the control method determines the channel status as normal status. The control method compares the current $FPS_N$ measured in the normal status with FPS−1 (Step 212). If the current $FPS_N$ is less than FPS−1, the control method sets the bit rate one step below a previous target bit rate (Step 214), and if the current $FPS_N$ is greater than or equal to FPS−1, the control method determines the final bit rate based on a target bit rate preset according to each uplink (UL) MCS level, i.e., 64 kbps, 128 kbps, 192 kbps and 256 kbps (Step 216).

If it is determined in step 210 that the wireless channel status is not a normal status, the control method compares an FPS value $FPS_{N-1}$ that it has received one second before the current time with FPS−1 (Step 218). If $FPS_{N-1}$<FPS−1, the control method determines if a preset $FPS_{Avg}$, or Avg($FPS_{N-1}$+$FPS_N$), is True or False (Step 220). If $FPS_{Avg}$ is True, the control method increases the bit rate by one step against the previous target bit rate (Step 224).

However, if $FPS_{Avg}$ is False, the control method decreases the bit rate by one step against the previous target bit rate (Step 226).

Further, if it is determined in step 210 that the wireless channel status is not a normal status, the control method compares the FPS value $FPS_{N-1}$ that it has received one second before the current time with FPS−1 (Step 218). If $FPS_{N-1}$>FPS+1 (Step 222) and the preset $FPS_{Avg}$ is True (Step 228), the control method maintains the bit rate at the previous target bit rate. However, when the previous target bit rate is the minimum bit rate, for example, 64 kbps, the control method increases the bit rate by one step (Step 230). If $FPS_{Avg}$ is False, the control method decreases the bit rate by one step against the previous target bit rate (Step 232).

The process of determining an encoding bit rate of the video encoder by classifying the wireless channel status into normal and abnormal statuses based on the FPS value (Steps 212~232) can be mathematically expressed as Equation (2).

$$\begin{cases} \text{Normal,} \begin{cases} \text{If } (FPS_N < FPS-1) \\ = \begin{cases} \text{True, } T_{BitRate} = \text{Decrease Bit Rate} \\ \text{False, } T_{BitRate} = \text{Refer Uplink MCS Level} \end{cases} \end{cases} \\ \text{Abnormal,} \begin{cases} \text{If } (FPS_{N-1} < FPS-1) \\ FPS_{Avg} = \begin{cases} \text{True, } T_{BitRate} = \text{Increase Bit Rate} \\ \text{False, } T_{BitRate} = \text{Decrease Bit Rate} \end{cases} \\ \text{If } (FPS_{N-1} > FPS+1) \\ FPS_{Avg} \begin{cases} \text{True, } T_{BitRate} = \text{Compensate Bit Rate} \\ \text{False, } T_{BitRate} = \text{Decrease Bit Rate} \end{cases} \end{cases} \end{cases} \quad (2)$$

$$* FPS - 1 < PFS_{Avg} < FPS + 1$$

where, $FPS_{Avg} = Avg \cdot \left( \sum (PFS_{N-1} + PFS_N) \right)$

The control method compares the bit rate determined from each step with a target bit rate designated by a downlink (DL) MCS level of a remote (Step 234), and determines the final target bit rate (Step 236). This can be mathematically expressed as Equation (3).

$$\text{If } (T_{BitRate} \leq BitRate\ RemoteDMCLevel) = \begin{cases} \text{True, } T_{FinalBitRate} = T_{BitRate} \\ \text{False, } T_{FinalBitRate} = BitRate\ RemoteDMCSLevel \end{cases} \quad (3)$$

As described above, the present invention senses the channel status in the

WiBro system, and if the channel status of the reception side is unstable even though the channel status of the transmission side is good, the invention can determine the final encoding bit rate of the video encoder taking into account the channel status of the reception side, making it possible to efficiently receive video data.

In the WiBro system according to an embodiment of the present invention, the video quality can be guaranteed as the bit rate given during video data encoding is higher. However, in the network congestion situation, as the bit rate is higher, a Packet Loss Ratio (PLR) is higher, resulting in a decrease in the video quality. Therefore, for high video quality, it is necessary to properly adjust the bit rate according to the network situation.

FIGS. 3A to 3D are detailed flowcharts illustrating bit rate decision based on channel status in the bit rate control method of a video CODEC during video data transmission according to an embodiment of the present invention. This is bit rate decision based on each set range of the bit rate previously set in the UL MCS Level according to an embodiment of the present invention, and the bit rate's set range is divided into 4 levels of 64 kbps, 128 kbps, 192 kbps and 256 kbps. It should be noted that the bit rate's set range can be properly set taking into account the target video size and access rate of the service network.

Figure 3A:
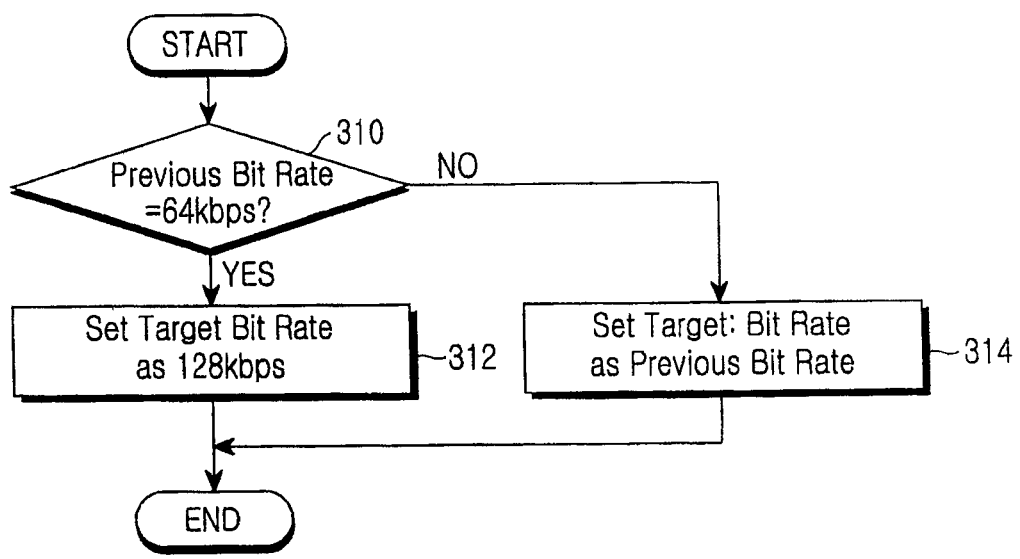
FIGS. 3A to 3D are detailed flowcharts illustrating bit rate decision based on channel status in the bit rate control method of a video CODEC during video data transmission according to an embodiment of the present invention.

In FIG. 3A, the control method determines if the set range of a previous bit rate is 64 kbps (Step 310). If the set range is 64 kbps, the control method determines the target bit rate as 128 kbps (Step 312), and if the previous bit rate is not 64 kbps, the control method determines the current bit rate as the previous bit rate (Step 314).

Figure 3B:
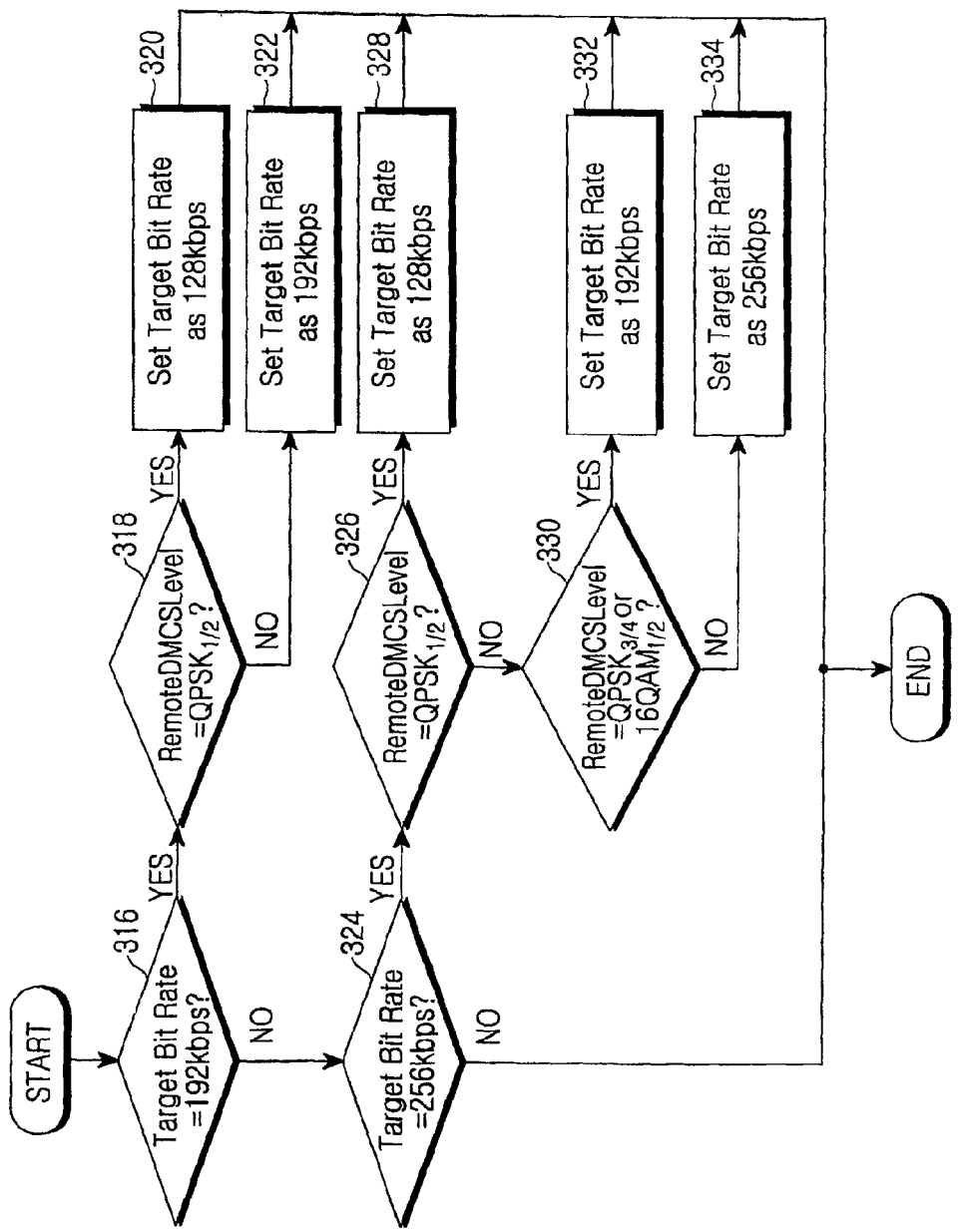

In FIG. 3B, the control method determines if the target bit rate of the current bit rate is 192 kbps (Step 316). If the target bit rate is 192 kbps, the control method determines if DL MCS Level of the remote is QPSK ½ (Step 318). If DL MCS Level of the remote is QPSK ½, the control method sets the target bit rate as 128 kbps (Step 320), and otherwise, sets the target bit rate as 192 kbps (Step 322).

The control method determines if the target bit rate of the current bit rate is 256 kbps (Step 324) and checks if DL MCS Level of the remote is QPSK ¾ (Step 326). If DL MCS Level of the remote is QPSK ¾, the control method sets the target bit rate as 128 kbps (Step 328). Otherwise, the control method determines if DL MCS Level of the remote is QPSK ¾ or 16QAM ½ (Step 330). If DL MCS Level of the remote is QPSK ¾ or 16QAM ½, the control method sets target bit rate as 192 kbps (Step 332), and otherwise, sets the target bit rate as 256 kbps (Step 334).

Figure 3C:
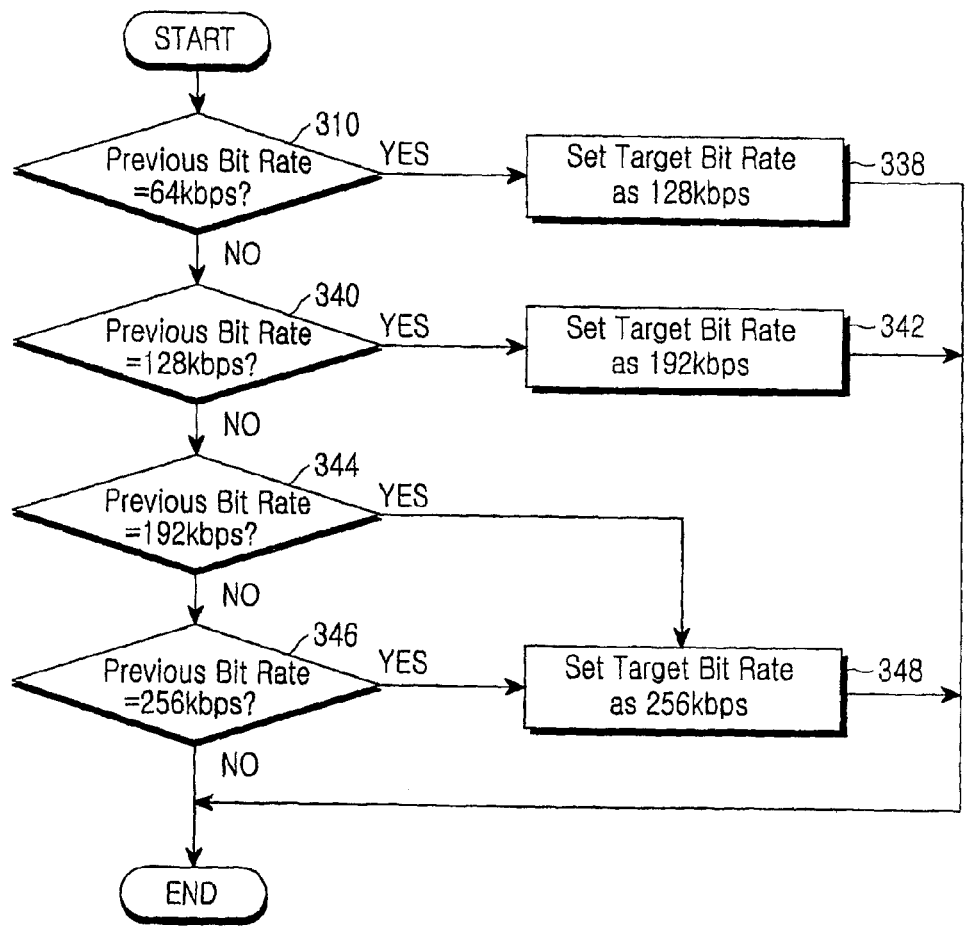

In FIG. 3C, the control method determines if the set range of the previous bit rate is 64 kbps (Step 310). If the set range is 64 kbps, the control method determines the target bit rate as 128 kbps (Step 338), and if the previous bit rate is not 64 kbps, the control method determines if the previous bit rate is 128 kbps (Step 340). If the previous bit rate is 128 kbps, the control method sets the target bit rate as 192 kbps (Step 342), and otherwise, checks if the previous bit rate is 192 kbps (Step 344). If the previous bit rate is 192 kbps, the control method sets the target bit rate as 256 kbps (Step 348).

Figure 3D:
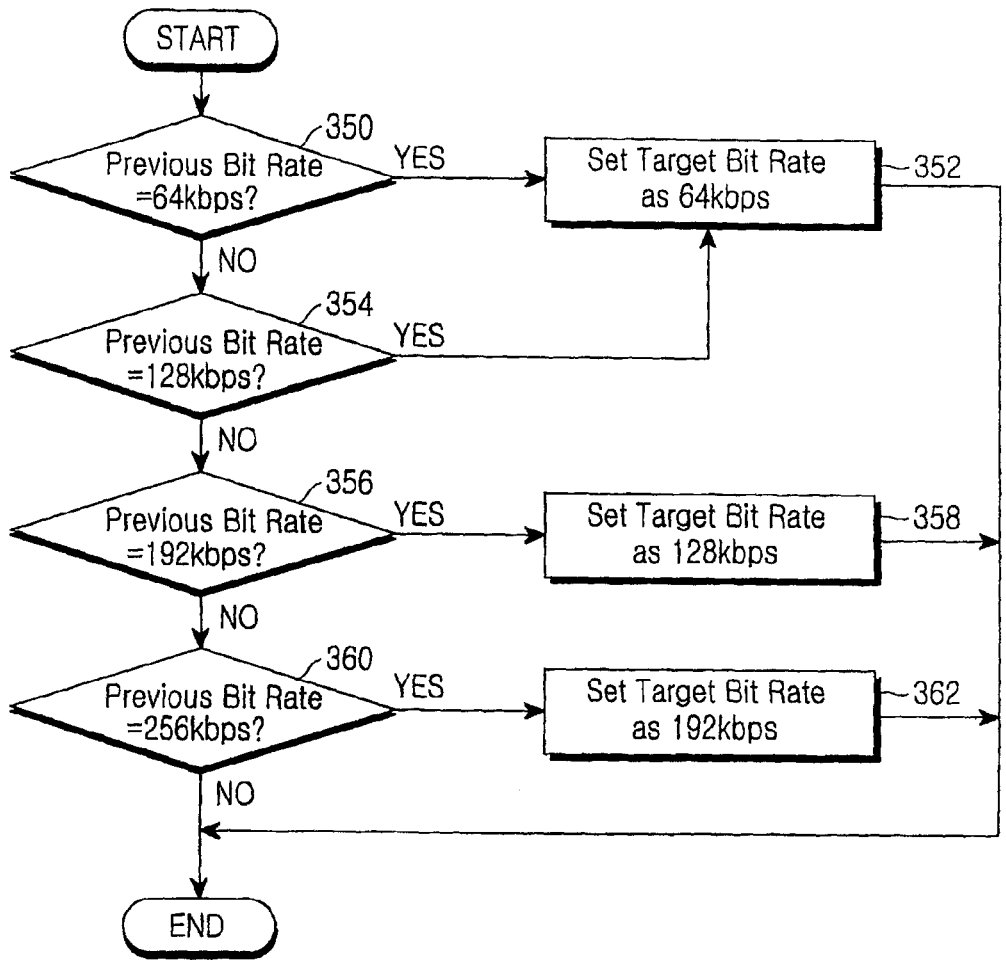

In FIG. 3D, the control method determines if the previous bit rate is 64 kbps (Step 350). If the previous bit rate is 64 kbps, the control method sets the target bit rate as 64 kbps (Step 352), and otherwise, checks if the previous bit rate is 128 kbps (Step 354). If it is checked that the previous bit rate is 128 kbps, the control method sets the target bit rate as 64 kbps (Step 352), and otherwise, checks if the previous bit rate is 192 kbps (Step 356). If it is checked that the previous bit rate is 192 kbps, the control method sets the target bit rate as 128 kbps (Step 382), and otherwise, checks if the previous bit rate is 256 kbps (Step 360). If the previous bit rate is 256 kbps, the control method sets the target bit rate as 192 kbps.

For performance verification of the present invention, the above-stated embodiment of the present invention will be simulated using a network simulator.

Figure 4:
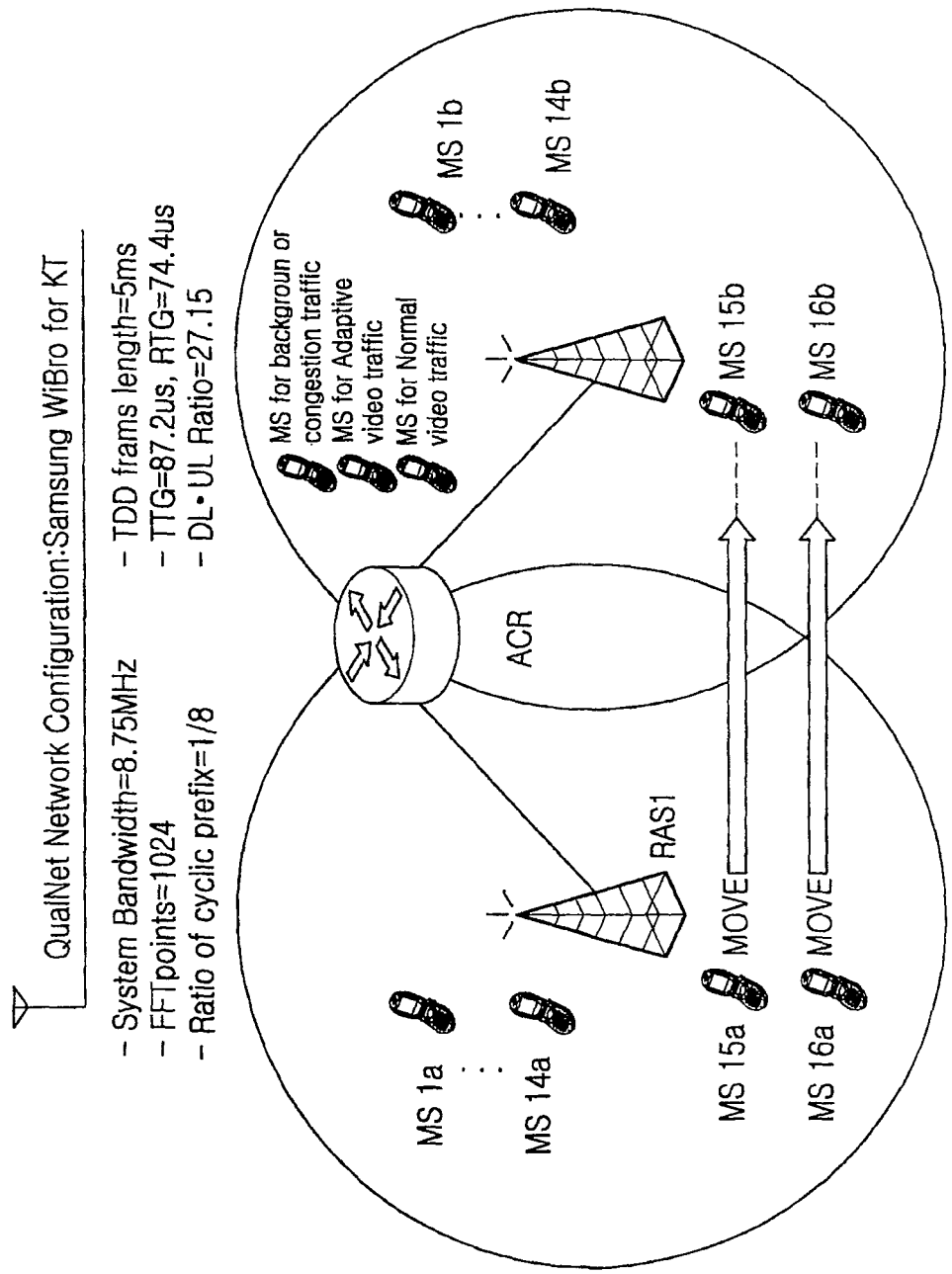
FIG. 4 is a diagram schematically illustrating a simulator environment for a test of video data transmission quality according to the present invention.

For this purpose, FIG. 4 schematically illustrates a simulator environment for a test of video data transmission quality according to the present invention. The simulator environment for a scenario used herein is as shown in FIG. 4.

Referring to FIG. 4, the system bandwidth is 8.75 MHz, a Time Division Duplex (TDD) frame length is 5 ms, the number of Fast Fourier Transform (FFT) points is 1024, a Tx/Rx Transition Gap (TTG) is 87.2 us, an Rx/Tx Transition Gap (RTG) is 74.4 us, a ratio of cyclic prefix is ⅛, and a DL:UL Ratio is 27:15. The total number of terminals is 32, a network simulator 'QualNet version 3.9.5' is used to simulate the real-time video transmission quality of the present invention depending on the presence/absence of network congestion, and a virtual WiBro network suitable for the presence/absence of network congestion is made. The simulation conditions used for simulation of the present invention are as shown in Table 1, and the simulation results based thereon are as shown in Table 2.

TABLE 1

| Simulation conditions | Set values |
| --- | --- |
| Simulation time | 200 sec |
| MS1a -> MS1b, . . . , MS13a -> MS13b | CBR 130 kbps for 10~200 sec |
| MS1a -> MS1b, . . . , MS13a -> MS13b | CBR 130 kbps for 10~200 sec |
| MS14a-MS14b | Bidirectional CBR 500 kbps for 20~70 sec and 130~170 sec |
| MS15a-MS15b | Real-time video stream @ fixed 256 kbps for 10~200 sec |
| MS16a-MS16b | Real-time video stream to which proposed algorithm and four fixed video bit rates are applied for 10~200 sec |
| MS15a, MS16a | 60-Km/H movement, handover occurred |

TABLE 2

| | | Simulation result values | | Comparison in Improvement between prior application and this application | |
| --- | --- | --- | --- | --- | --- |
| | | PSNR (dB) | PLR (%) | | |
| MS16a-MS16b | | average value | average value | PSNR (dB) improvement | PLR(%) Improvement |
| Invention | | 27.165 | 0.0092 | — | — |
| KR Patent Application No. 2007-102000 | | 27.768 | 0.0645 | −0.6 | 5.5% |
| KR Patent Application No. 2007-39530 | | 24.671 | 0.0095 | 2.5 | 0.0% |
| Fixed video bit rate | 64 kbps | 24.542 | 0.0140 | 2.6 | 0.5% |
| | 128 kbps | 27.119 | 0.0327 | 0.0 | 2.4% |
| | 192 kbps | 25.656 | 0.1660 | 1.5 | 15.7% |
| | 256 kbps | 22.400 | 0.2828 | 4.8 | 27.4% |

The simulation results show that though the invention is almost similar to the prior art in a Peak Signal to Noise Ratio (PSNR), PLR improves up to 0%~27%. It can be appreciated that a high PLR, since it prevents restoration of frames, causes degradation of the video quality, and this is proved by the PSNR value.

In conclusion, the algorithm according to an embodiment of the present invention shows the improved results compared with the fixed video bit rate, in all cases. This algorithm can adaptively decrease the video bit rate in the poor network situation and increase the video bit rate in the better network situation, thereby obtaining the best video quality.

As is apparent from the foregoing description, when a WiBro terminal (or Mobile Station (MS)) transmits real-time video data in the WiBro system, the present invention, the present invention adaptively decreases the video bit rate in the poor network situation and increases the video bit rate in the better network situation taking into account not only the physical situation of the local wireless network but also the end-to-end wireless channel status information, thereby providing the best video quality.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for variably controlling a bit rate of video data through end-to-end channel status sensing in a Wireless Broadband (WiBro) network, the method comprising:
classifying wireless channel statuses of a transmission side and a reception side into normal and abnormal statuses during video data transmission;
variably controlling and determining an encoding bit rate of a transmission side's encoder according to the classification result; and
comparing the determined encoding bit rate with a Down Link Modulation & Coding Selection Level (DL MCS Level) which is an encoding scheme parameter of the reception side, so as to vary a final encoding bit rate of the transmission side based on the comparison result.

2. The method of claim 1, wherein classifying wireless channel statuses into normal and abnormal statuses is performed based on a Frame Per Second (FPS) value indicating the number of frames transmittable per second during video data transmission.

3. The method of claim 1, wherein when the wireless channel status is normal status, an $FPS_{N-1}$ value indicating an FPS value which was transmitted one second before the current time is maintained within a preset time range.

4. The method of claim 1, wherein the abnormal status comprises at least one of occurrence of traffic congestion, an increase in the number of users, and interference or other unstable channel status.

5. The method of claim 1, wherein determining a final target bit rate is expressed as the following equation;

$$\text{If } (T_{BitRate} \le BitRate\ RemoteDMCLevel) = \begin{cases} \text{True}, T_{FinalBitRate} = T_{BitRate} \\ \text{False}, T_{FinalBitRate} = BitRate\ RemoteDMCSLevel. \end{cases}$$

6. The method of claim 1, wherein when the wireless channel status is abnormal status, a bit rate of an $FPS_{N-1}$ value indicating an FPS value which was transmitted one second before the current time is differently determined for a case where the $FPS_{N-1}$ value is less than FPS-1 and a case where the $FPS_{N-1}$ value is greater than FPS+1.

7. The method of claim 6, wherein an average value of FPS which is applied in common to the case where the $FPS_{N-1}$ value is greater than FPS+1 and the case where the case where the $FPS_{N-1}$ value is less than FPS-1, is set by adding the currently transmitted FPS value $FPS_N$ to the $FPS_{N-1}$ value indicating an FPS value which was transmitted one second before the current time.

8. The method of claim 6, wherein an average value of FPS for the case where the $FPS_{N-1}$ value indicating an FPS value which was transmitted one second before the current time is less than FPS-1 is True, a bit rate increased from a previous target bit rate is determined.

9. The method of claim 7, wherein an average value of FPS for the case where the $FPS_{N-1}$ value indicating an FPS value which was transmitted one second before the current time is less than FPS-1 is True, a bit rate increased from a previous target bit rate is determined.

10. The method of claim 6, further comprising:
when the average value of FPS for the case where the $FPS_{N-1}$ value is greater than FPS+1 is True, checking a previous target bit rate; and
when the previous target bit rate is not a minimum bit rate, maintaining the previous target bit rate.

11. The method of claim 7, further comprising:
when the average value of FPS for the case where the $FPS_{N-1}$ value is greater than FPS+1 is True, checking a previous target bit rate; and
when the previous target bit rate is not a minimum bit rate, maintaining the previous target bit rate.

12. The method of claim 10, further comprising:
when the previous target bit rate is a minimum bit rate, determining a bit rate increased from the previous target bit rate.

13. The method of claim 11, further comprising:
when the previous target bit rate is a minimum bit rate, determining a bit rate increased from the previous target bit rate.

14. The method of claim 6, further comprising:
when the average value of FPS for both the case where the $FPS_{N-1}$ value is greater than FPS+1 and the case where the $FPS_{N-1}$ value is less than FPS-1 is False, determining a bit rate decreased from the previous target bit rate.

15. The method of claim 7, further comprising:
when the average value of FPS for both the case where the $FPS_{N-1}$ value is greater than FPS+1 and the case where the $FPS_{N-1}$ value is less than FPS-1 is False, determining a bit rate decreased from the previous target bit rate.

16. The method of claim 12, wherein the minimum bit rate is 64 kbps.

17. The method of claim 13, wherein the minimum bit rate is 64 kbps.

* * * * *

UNITED STATES PATENT AND TRADEMARK OFFICE
CERTIFICATE OF CORRECTION

PATENT NO.         : 8,520,513 B2
APPLICATION NO.    : 12/790915
DATED              : August 27, 2013
INVENTOR(S)        : Do-Young Joung et al.

It is certified that error appears in the above-identified patent and that said Letters Patent is hereby corrected as shown below:

In the Claims:
    Column 8, Claim 7, Lines 54-55 should read as follows:
    "and the case where the $FPS_{N-1}$ ..."

Signed and Sealed this
Eighth Day of October, 2013

Teresa Stanek Rea
*Deputy Director of the United States Patent and Trademark Office*